US007979192B2

(12) United States Patent
Morrison et al.

(10) Patent No.: US 7,979,192 B2
(45) Date of Patent: Jul. 12, 2011

(54) AIRCRAFT-ENGINE TREND MONITORING SYSTEM

(76) Inventors: Brian D. Morrison, Hopkinton, MA (US); Stephan A. Hanvey, Anderson, SC (US); Ronald E. Wilkinson, Mobile, AL (US)

( * ) Notice: Subject to any disclaimer, the term of this patent is extended or adjusted under 35 U.S.C. 154(b) by 984 days.

(21) Appl. No.: 11/693,834

(22) Filed: Mar. 30, 2007

(65) Prior Publication Data

US 2007/0260374 A1 Nov. 8, 2007

Related U.S. Application Data

(60) Provisional application No. 60/744,038, filed on Mar. 31, 2006.

(51) Int. Cl.
*G01C 23/00* (2006.01)
(52) U.S. Cl. .............................. 701/99; 701/35; 702/179
(58) Field of Classification Search ............... 701/100, 701/99, 102, 33–35; 702/179, 186, 182–183; 244/75–99.9
See application file for complete search history.

(56) References Cited

U.S. PATENT DOCUMENTS

| | | | | |
|---|---|---|---|---|
| 4,409,670 | A * | 10/1983 | Herndon et al. | 701/14 |
| 4,442,491 | A * | 4/1984 | Olhausen, Jr. | 701/221 |
| 4,470,116 | A * | 9/1984 | Ratchford | 701/35 |
| 5,075,881 | A * | 12/1991 | Blomberg et al. | 703/2 |
| 5,826,206 | A * | 10/1998 | Nemeth | 701/35 |
| 6,009,356 | A * | 12/1999 | Monroe | 701/14 |
| 6,122,575 | A * | 9/2000 | Schmidt et al. | 701/29 |
| 6,574,537 | B2 * | 6/2003 | Kipersztok et al. | 701/29 |
| 6,631,315 | B1 * | 10/2003 | Gibbs et al. | 701/29 |
| 6,662,091 | B2 * | 12/2003 | Wilson et al. | 701/33 |
| 6,782,346 | B2 * | 8/2004 | Bond et al. | 702/183 |
| 7,050,894 | B2 * | 5/2006 | Halm et al. | 701/33 |
| 7,088,264 | B2 * | 8/2006 | Riley | 340/963 |

(Continued)

FOREIGN PATENT DOCUMENTS

DE 101 53 151 * 10/2001

(Continued)

OTHER PUBLICATIONS

A two-bit scheme for routing lookup; Prabhakar, B.; Gupta, P.; Boyd, S.; Information Theory and Networking Workshop, 1999 Digital Object Identifier: 10.1109/ITNW.1999.814355; Publication Year: 1999.*

(Continued)

*Primary Examiner* — Cuong H Nguyen
(74) *Attorney, Agent, or Firm* — Rajesh Vallabh; Foley Hoag LLP

(57) ABSTRACT

Methods and systems for aircraft engine trend monitoring include periodically recording the outputs of engine-condition sensors and analyzing the results to examine piston-engine performance trends and predict the need for engine maintenance. Various analyses can be performed, separately or in parallel, including comparing the current parameter values with values recorded for that parameter in previous instances of similar operating conditions; comparing parameter values to predetermined nominal ranges; and detecting parameter values that exhibit trends over time that if followed would result in out-of-bound readings. Sensed parameter values can also be used to detect when recommended engine operating conditions are being exceeded. By using the results of the analyses to inform engine maintenance scheduling and provide alerts to the pilot and maintenance staff regarding recommended engine performance trends and/or operating condition exceedances, the methods and systems contribute to enhancing the level of safety that can be achieved despite significant maintenance-budget reductions.

28 Claims, 6 Drawing Sheets

U.S. PATENT DOCUMENTS

| | | | |
|---|---|---|---|
| 7,113,852 B2 * | 9/2006 | Kapadia et al. | 701/33 |
| 7,132,982 B2 * | 11/2006 | Smith et al. | 342/456 |
| 7,529,603 B2 * | 5/2009 | Allen et al. | 701/3 |
| 2002/0087258 A1 | 7/2002 | Johnson | |
| 2003/0187554 A1 * | 10/2003 | Henry et al. | 701/29 |
| 2004/0073404 A1 | 4/2004 | Brooks et al. | |
| 2004/0189521 A1 * | 9/2004 | Smith et al. | 342/387 |
| 2005/0065682 A1 * | 3/2005 | Kapadia et al. | 701/35 |

FOREIGN PATENT DOCUMENTS

| | | |
|---|---|---|
| EP | 0843244 | 5/1998 |
| EP | 1114991 | 7/2001 |
| EP | 1288644 | 3/2003 |
| EP | 1418481 | 5/2004 |

OTHER PUBLICATIONS

Performance comparison of robust laser interferometer (RLI) and contact accelerometer technology in aviation health monitoring Goodenow, T.; Karchnak, M.; Shipman, R.; Aerospace Conference, 2004. Proceedings. 2004 IEEE; vol. 6; Digital Object Identifier: 10.1109/AERO.2004.1368183; Publication Year: 2004 , pp. 3663-3685 vol. 6.*

Fabry-Perot photonic temperature sensor system; Tuma, M.L.; Elam, K.A.; Sawatari, T.; Gaubis, P.; Yuping Lin; Instrumentation in Aerospace Simulation Facilities, 1997. ICIASF '97 Record., International Congress on; Digital Object Identifier: 10.1109/ICIASF.1997.644755 ; Publication Year: 1997 , pp. 369-377.*

Ceramic strain gages for propulsion health monitoring; Gregory, O.J.; Qing Luo; Digital Avionics Systems Conferences, 2000. Proceedings. DASC. The 19$^{th}$; vol. 2 ; Digital Object Identifier: 10.1109/DASC.2000.884914; Publication Year: 2000 , pp. 6E2/1-6E2/8 vol. 2.*

The Shuttle activation monitor: a system for direct comparison of gamma-ray detector materials in a space environment; Haskins, P.S.; McKisson, J.E.; Ely, D.W.; Weisenberger, A.G.; Piercey, R.B.; Dyer, C.S.; Ramayya, A.V.; Camp, D.C.; Nuclear Science, IEEE Transactions on; vol. 37, Issue: 3, Part: 1-2; Digital Object Identifier: 10.1109/23.*

Assessment of the Robust Satellite Technique (RST) for volcanic ash plume identification and tracking; Marchese, F.; Corrado, R.; Genzano, N.; Mazzeo, G.; Paciello, R.; Pergola, N.; Tramutoli, V.; Use of Remote Sensing Techniques for Monitoring Volcanoes and Seismogenic Areas, 2008. USEReST 2008. Second Workshop on; Digital Object Identifier: 10.*

V-22 Data Visualization Toolset (VDVT) Implementation; Dousis, D.A.; Strohmeyer, M.; Lasiter, M.; Stonebraker, M.; Aerospace Conference, 2007 IEEE; Digital Object Identifier: 10.1109/AERO.2007.352832; Publication Year: 2007 , pp. 1-14.*

Carl A. Palmer; Combining Gas Path Analysis with Bayesian Belief Networks—A New Approach used for Test Cell Diagnostics During GE Commercial Jet Engine Overhaul; DEAN Oct. 17, 1997; pp. 1-19; Enter Software, Inc., cited by others.*

International Search Report and Written Opinion for PCT/US2007/065577.

* cited by examiner

Aircraft Trend Monitoring Data Log

*Aircraft # N1492C*     *Serial # 0567*

| Date | Zulu | Hours | Oil Used | Alt. | Temp. | Pressure | RPM | MAP | %Pwr | KTAS | KIAS | KOAS | GPH | Mixture | EGT | CHT | Oil T | Oil T |
|---|---|---|---|---|---|---|---|---|---|---|---|---|---|---|---|---|---|---|
| 11/16/2006 | 1:20 | | | 6000 | 12 | | 2500 | 22.5 | 72 | | | | 16.8 | 75 Rich | 1445 | 345 | 168 | 44 |
| Sum: | | | | | | | | | | | | | | | | | | |
| Avg: | | | | 6000 | 12 | | 2500 | 22.5 | 72 | | | | 16.8 | | 1445 | 345 | 168 | 44 |
| Min: | | | | 6000 | 12 | | 2500 | 22.5 | 72 | | | | 16.8 | | 1445 | 345 | 168 | 44 |
| Max: | | | | 6000 | 12 | | 2500 | 22.5 | 72 | | | | 16.8 | | 1445 | 345 | 168 | 44 |

FIG. 5

AIRCRAFT-ENGINE TREND MONITORING SYSTEM

RELATED APPLICATIONS

This application claims priority to, and incorporates by reference, the entire disclosure of U.S. Provisional Patent Application No. 60/744,038, filed on Mar. 31, 2006.

BACKGROUND OF THE INVENTION

1. Field

The present invention is directed to engine operation and maintenance. It finds particular, although not exclusive, application to piston-engine aircraft.

2. Background Information

A large volume of personal travel occurs by air. For destinations of any distance, it is almost always the fastest travel mode and, in terms of injuries per passenger mile, the safest. The relative safety of that air transportation mode results from a number of factors. Among these are the stringent maintenance requirements that are imposed upon civil aviation.

Although such requirements have contributed to the high level of safety that the flying public enjoys, that safety has come at a cost. And this cost is particularly evident in relatively low-volume, short-distance routes. Air travel by major commercial carriers between lower-population locales has tended to be limited or unavailable since such routes can be supported most cost-effectively by small aircraft in, e.g., "air-taxi" or "air-cab" services. Although such services are beginning to be deployed in the United States, the amount of travel that would be economical on such routes would be greater if the maintenance cost per airplane could be reduced while simultaneously enhancing operational safety.

SUMMARY OF THE INVENTION

We have developed a way of predicting engine issues before they become problems and therefore reduce piston-engine aircraft maintenance cost significantly, while enhancing flight safety and reducing the manufacturer's warranty cost. In accordance with our approach, the outputs of engine-condition sensors are recorded periodically, preferably many times per minute, and the results are analyzed in such a fashion as to examine piston-engine performance trends and predict the need for engine maintenance. The result can be significantly reduced maintenance costs, because such monitoring makes it safe to lengthen the average time between expensive engine overhauls; overhauls can be pre-scheduled for longer intervals, with additional overhauls performed in the interim only when the results of sensor monitoring indicate the need for maintenance action.

The analysis can be performed in a number of ways. For example, the current value of a given operating parameter such as oil pressure or a particular cylinder's exhaust-gas temperature can be compared with the values that were recorded for that parameter in previous instances of similar operating conditions; too great a difference tends to suggest that something in the engine may need attention. Another approach, which would typically be employed in parallel, would be to compare parameter values to predetermined nominal ranges. Yet another approach would be to detect values that, although not outside their nominal ranges, exhibit trends over time that if followed will soon result in out-of-bound readings. And sensed values can also be used to detect when the pilot is exceeding the recommended engine operating conditions, or when oil is being added too frequently, which may indicate excessive wear.

Such analyses' results contribute to maintenance-cost reduction in at least a couple of ways. Between flights, maintenance personnel can consult the analysis results to determine when an overhaul is likely to be needed and, possibly, its extent. The results can also be used during or at the conclusion of each flight to alert the pilot to the occurrence of conditions that, typically without yet having impaired safety, indicate that some maintenance action should be taken. Both approaches contribute to the level of safety that can be achieved despite significant maintenance-budget reduction.

In one embodiment, a method for monitoring performance of an engine, comprises obtaining engine performance data, obtaining environmental data, determining if the engine is operating within a predetermined parameter set, obtaining, when the engine is operating within the predetermined parameter set, previous performance data from at least one previous use of the engine when the engine was operating within the predetermined parameter set, comparing the performance data to the previous performance data and outputting results of comparing the data. The engine may be a piston engine and/or an aircraft engine.

The method may also include controlling the engine to operate within the predetermined parameter set, where controlling the engine can include maintaining a certain altitude, setting the engine at a recommended percent cruise power and setting a fuel mixture to a recommended best power mixture or best economy mixture. In one aspect, the recommended percent cruise power is set at 72%±2% and the best power mixture is set at 75° F.±10° F. rich of peak exhaust gas temperature.

In one aspect, obtaining the performance data may include obtaining instrument outputs for one or more of oil temperature, oil pressure, manifold pressure, engine speed, fuel flow, air speed, air temperature, cylinder head temperature and exhaust gas temperature. Obtaining the environmental data may include obtaining instrument outputs for one or more of true airspeed, indicated airspeed, pressure altitude, density altitude, outside air temperature, and vertical speed.

Comparing the performance data may include obtaining a predicted value for at least one instrument output, storing a difference between the predicted value and an actual value of the at least one instrument output to a current trend record and storing other instrument outputs to the current trend record. Obtaining previous performance data may include determining if trend records for a predetermined number of previous uses are stored.

In one aspect, comparing may include obtaining averages for values stored in the trend records for previous uses and comparing values of the current trend record to corresponding averages from the trend records of previous uses. Obtaining averages may include obtaining averages for chronological groupings of trend records for previous uses. Outputting may include displaying values of the current trend record, displaying the corresponding averages and displaying tolerances associated with respective values of the current trend record. Displaying may include displaying values associated with instrument outputs taken from a listing of instrument outputs including engine speed, manifold pressure, fuel flow, air speed, altitude, oil temperature, oil pressure, maximum cylinder head temperature, minimum cylinder head temperature, maximum exhaust gas temperature, exhaust gas temperature of the first cylinder to peak and exhaust gas temperature of the last cylinder to peak.

In one aspect, obtaining performance data may include providing an indication to an operator when a value of at least one of the instrument outputs differs from a predicted value by more than a predetermined tolerance. The predicted value may be obtained from a lookup table, wherein interpolation calculations may be performed.

In one aspect, obtaining performance data may include periodically obtaining and recording instrument outputs for each of the performance data and the environmental data. Outputting may include displaying a historical record of the periodically obtained instrument output.

Without regard for the type of engine in one aspect, obtaining performance data may include providing an indication to an operator when a value of at least one of the performance data differs from a predicted value by more than a predetermined tolerance, wherein the predicted value may be obtained from a lookup table by performing interpolation calculations within the lookup table.

Without regard for the type of engine in one aspect, comparing the performance data may include obtaining a predicted value for at least one instrument output, storing a difference between the predicted value and an actual value of the at least one instrument output to a current trend record and storing other instrument outputs to the current trend record. Obtaining previous performance data may include determining if trend records for a predetermined number of previous uses are stored. Comparing may include obtaining averages for values stored in the trend records for previous uses and comparing values of the current trend record to corresponding averages from the trend records of previous uses. Outputting may include displaying values of the current trend record, displaying the corresponding averages and displaying tolerances associated with respective values of the current trend record.

BRIEF DESCRIPTION OF THE DRAWINGS

The invention description below refers to the accompanying drawings, of which:

FIG. 5 is an example of a trend monitoring data log.

DETAILED DESCRIPTION OF ILLUSTRATIVE EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

Figure 1:
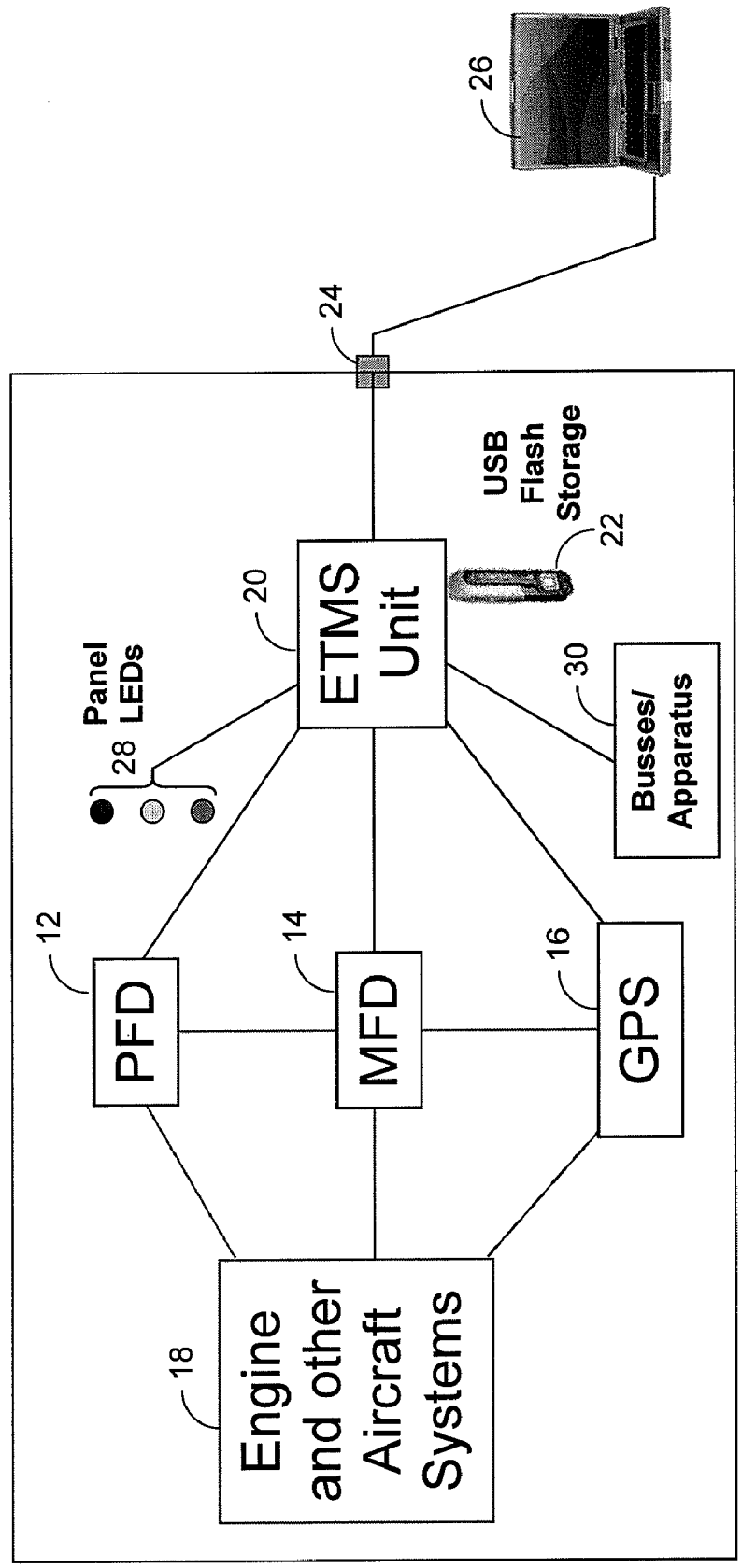
FIG. 1 is a block diagram showing apparatus for practicing the present invention.

FIG. 1 depicts in block diagram form one type of system that may be employed to carry out the present invention's teachings. Conventionally, a small, piston-engine aircraft will include on-board equipment such as a primary flight display 12, a multifunction display (MFD) 14, and a global-positioning system (GPS) 16, all of which monitor the operation of the engine and other aircraft systems 18 and provide outputs that represent various aspects of those systems' operation and the aircraft's state data, such as altitude, air speed and outside air temperature and/or other environmental data.

Of course, not all aircraft employ the same mix of instrumentation, and some aircraft to which the present invention's teachings will be applied will include instrumentation different from this mix. Whatever the mix is, though, some set of instrument outputs will be collected by an engine-trend-monitoring-system unit 20, which records the collected data in memory, such as the illustrative removable flash memory 22 of FIG. 1, and performs on the collected data analyses of a type that will be described below. Monitoring unit 20 will typically be embodied in a microprocessor-based circuit and include the various interface circuitry required to communicate with the aircraft's data busses and/or exterior apparatus 30. In addition or instead, monitoring unit 20 may be configured for manual recording of some instrument outputs.

In the illustrated embodiment, the analyses that will shortly be described are performed exclusively by the on-board monitoring unit 20, with separate, ground-based equipment performing little if any of the analyses. Although we prefer that approach, various aspects of the invention can be practiced with a different division of labor; some or all of the analyses—indeed even some or all of the recording—can in principle be performed outside the aircraft, in ground-based equipment, by using a data-link between the aircraft and the ground-based equipment.

Although we prefer to perform the analyses on the aircraft, we believe that it will make sense in many applications to use separate, typically ground-based apparatus to display the results of the various analyses and/or to compare the results from one aircraft with one or more other aircraft or to averages of a number of aircraft, as in fleet averages. To indicate this fact, FIG. 1 includes a ground-access port 24, which in practice could be, for instance, an Ethernet connector or some type of wireless or digital mobile broadband network interface.

Preferably, the monitoring unit 20 will provide the data in a web-server fashion: a processor/display 26, such as, but not limited to a conventional laptop, desktop computer, or other personal computer configured to run a conventional web browser can communicate with the unit, which can respond by sending the requested information in a web-page format. Obviously, though, other data-transmission formats, processors and/or displays can be used in addition or instead.

Some embodiments may additionally or instead make the detailed information display available in the aircraft itself The reason why the illustrated embodiment does not is that in many of the small, single-pilot aircraft to which the present invention's teachings will be of most benefit it is best to keep at a minimum the number of items to which flight personnel need to direct their attention. But some results of the analyses can be helpful to flight personnel and may be displayed or provided via a data channel for display as text and/or graphics on existing avionics' displays. As an example, the system 20 can monitor performance against the approved limits established in the manufacturer's FAA-approved Aircraft Flight Manual (AFM) for the aircraft, sometimes also be known as the Pilot's Operating Handbook (POH), and may alert the pilot to exceedances. Accordingly, some embodiments may compromise between that benefit and the goal of minimizing pilot distraction by including a rudimentary display to advise the pilot when he has entered an exceedance condition.

For the illustrative embodiment of FIG. 1, such a display may consist of, say, less than half a dozen indicator lights 28, preferably in the form of light-emitting diodes (LEDs). Exemplary applications of LEDs 29 may include using a single green LED to indicate that the monitoring system has currently detected no anomalies. A flashing yellow LED could be used to indicate that the pilot is operating the aircraft's engine outside of normal limits and should adjust operating settings to values that are consistent with the AFM. A steady yellow light may indicate that one of the monitored parameters has undergone a significant change. The appropriate response for the pilot in such a situation would typically be to report that fact to the appropriate maintenance personnel. A flashing red light could be employed as an indication that, although no particular parameter has undergone an unusually drastic change or strayed outside of nominal limits, one or more have exhibited worrisome trends, so particular attention to flight logs is justified. A steady red light may indicate an exceedance condition.

Other combinations of colors and/or flashing and/or steady lights, as well as audible signals may be used to convey this or other information and/or warnings to the pilot. For example, combinations of green and yellow LEDs could be used to indicate that the pilot is operating the aircraft within or outside of certain predetermined "cruise" conditions. As will be seen below, operating the aircraft within "cruise" conditions will serve the purpose of making data comparisons more meaningful. In addition or instead of the LEDs 28, the information display may be incorporated in new and/or available aircraft cockpit displays, such as the GPS unit 16 and/or MFD 14, to which information is digitally transmitted for display to the pilot.

Figure 2:
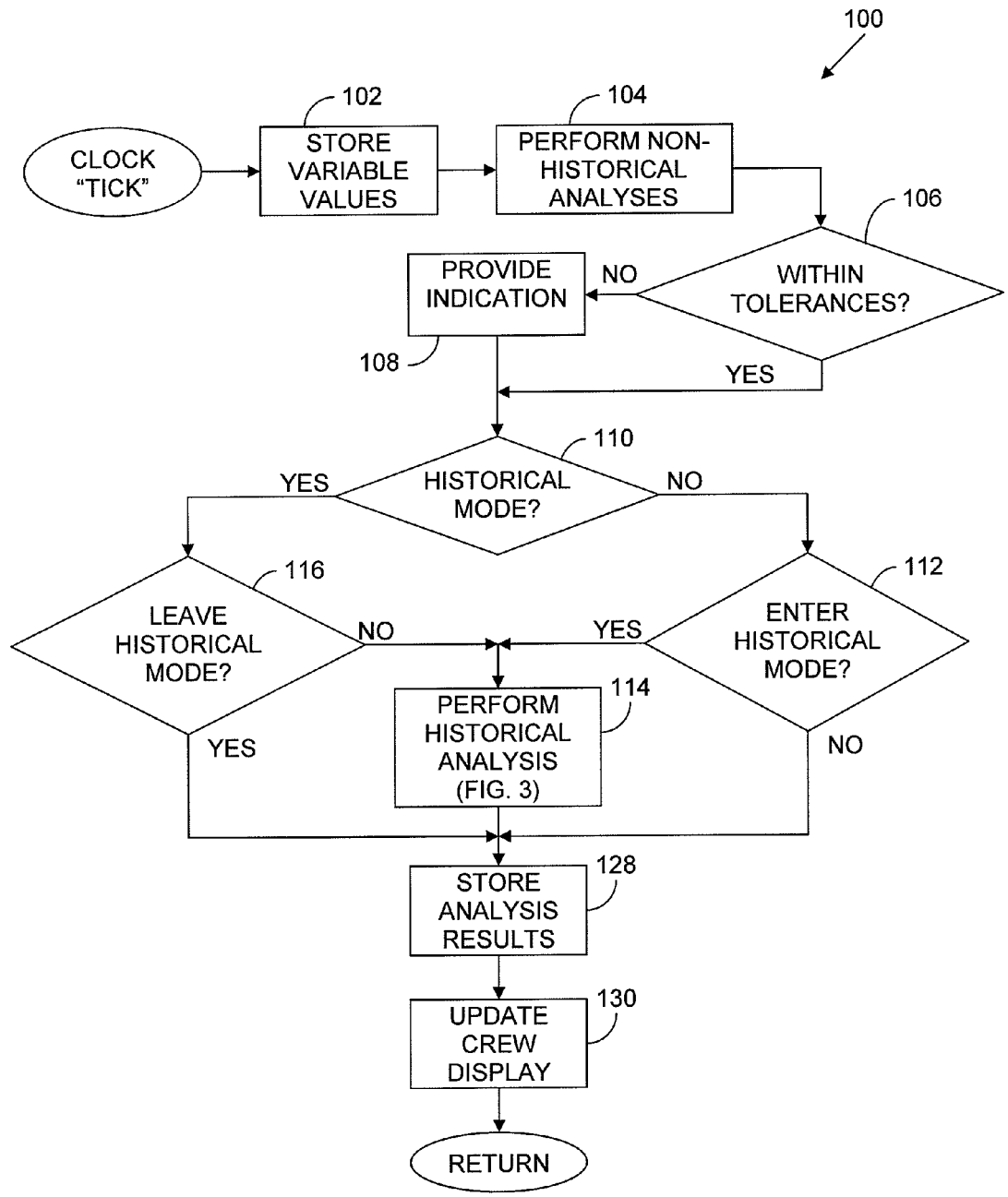
FIG. 2 is a flow chart of a routine that illustrates one way in which the present invention can be implemented.

FIG. 2 is a flowchart that depicts in simplified form a monitoring-analysis-approach that some embodiments of the invention may employ. For the sake of simplicity, we will assume here that the system enters the routine 100 periodically, at every "tick" of a sensor-system clock. The frequency at which this occurs will be selected to be appropriate to the parameters being recorded, and in some cases the frequencies may be different for different parameters. Again for the sake of simplicity, though, we assume here that the frequency is the same for all of them, and, for the sake of concreteness, we will assume a frequency of once every three seconds.

As FIG. 2's block 102 indicates, the system first records various sensor outputs. In typical modern-day avionics, such data may be readily accessed through the aircraft's various data busses, and the illustrated embodiment selects among the various quantities that can be obtained in that manner. A representative group of aircraft measurements obtained in this manner may be air speed, altitude, latitude and longitude, outside-air temperature (OAT), the number of propeller revolutions per minute (rpm), the engine's manifold pressure (MAP), the rate of fuel flow (FF), cylinder head temperature (CHT) of each cylinder, maximum exhaust-gas temperature, first-cylinder-to-peak and its respective exhaust-gas temperature (EGT), last-cylinder-to-peak and its respective exhaust-gas temperature, oil pressure, and oil temperature.

With the data thus taken, the system performs various analyses, as at block 104, which may be used to detect anomalies. Block 104 refers to these various analyses as "non-historical", since they depend only on current or very recent values. For many of the parameters, there are predetermined limits with which the system compares the measured values. These may be limits on the values themselves and/or limits in the amount of change since the last reading or from some average of the past few readings.

Other possible data analyses include flight miles per gallon as an index of engine operating efficiency, engine Blade HorsePower (BHP) as computed from observed parameters, temperature span between minimum and maximum CHT, temperature span between EGT for first cylinder to peak and last cylinder to peak, FF span between first cylinder to peak and last cylinder to peak, and engine duty cycle histograms. Engine life is directly influenced by duty cycle as determined by time spent at higher power settings. Engines which operate for longer periods at takeoff power settings tend to see reduced life and a greater frequency of component problems.

Additionally, there are readings that, although they reflect no maintenance issues, indicate that the crew needs to take some action. To obtain maximum efficiency, for example, particular values of MAP and FF as a function of altitude and/or air speed may be known to be desired. Also, the system may observe exhaust temperature as a function of fuel mixture and infer the desired temperature from the fact that optimum performance is known to result from a mixture that is, say, richer than the maximum-temperature mixture by enough to reduce the exhaust temperature by 75° from the maximum. At block 106, the system can determine if such measured performance parameters are within certain tolerances of expected values. The system may then advise the crew to adjust performance to the expected values if it has departed from desired operating conditions, as at block 108. Such advice or adjustment indications may be provided to the crew as discussed in relation to FIG. 1, i.e., through displays, such as LEDs 28, and/or audible signals.

Performance parameters are typically provided in the POH for the aircraft. For example, the POH may provide lookup tables for expected operational parameters, such as FF and air speed at a specific MAP, rpm, % power, altitude and outside air temperature. In addition to the expected operational parameters found in the POH, the system can maintain a database of, and/or the non-historical analyses of block 104 can provide, projected engine performance parameter values including, without limitation, CHT, EGT, CHT span, EGT span and other performance parameters discussed herein.

The system also performs "historical" analyses, i.e., compares current values with the values that the same aircraft previously exhibited under similar conditions. Now, the quality of the conclusions to be drawn from comparing a given flight's data with data from previous flights may initially seem problematic, since flight conditions vary so widely. The illustrated embodiment uses a number of expedients to mitigate this problem.

First, as was stated above in relation to LEDs 28, it prompts the crew to adopt certain predetermined, "cruise" conditions so that, for a given set of altitude and outside-air-temperature conditions, or set of parameters, variations in engine operating values will be relatively modest. As an example of adopting "cruise" conditions, the crew may:

(1) maintain a certain altitude;
(2) set cruise power in accordance with the applicable POH (e.g. 72%±2%); and
(3) set mixture to best power mixture in accordance with POH (e.g. 75° F.±10° F. rich of peak EGT).

In some instances, the mixture may be set to best economy mixture and/or the mixture may be set lean of peak.

As another way of mitigating problems associated with comparisons using varying flight conditions second, the illustrated embodiment performs the historical analysis only when it is in a "historical" mode, which it adopts when the craft has been in the predetermined cruise regime for a predetermined amount of time. Additionally, the projected engine performance parameter values can be used in performing the flight data comparisons. For example, the divergence in altitude between the current flight and a previous flight might be so great that direct comparison of the respective flight's operational parameters for trending may not provide reliable results. However, such divergences can be compensated for by making comparisons using the differences between the projected engine performance parameter values and the actual values.

As block 110 indicates, the system determines whether it has already entered its historical-analysis mode. If not, it then determines whether the aircraft has been operating stably under cruise conditions, as at block 112. This can be determined by, for example, observing that the number of propeller revolutions per minute has stayed within a suitably small range for some predetermined length of time, e.g., 2500±200 RPM for two minutes, and that the manifold pressure is within an appropriate tolerance of the optimum values, e.g., within 0.2 inches of optimum. If it thereby determines that stable cruise conditions prevail, it adopts the historical-analysis mode and performs historical analysis, as block 114 indicates. Otherwise, the current data's value for comparison purposes is limited, so the system dispenses with the historical analysis. Regardless of mode, the system captures critical aircraft and engine performance data periodically—every three seconds, as assumed in the exemplary embodiment—and records it to a non-volatile computer-readable medium which can be accessed and reviewed at a later time by ground-based personnel, though on-board access and/or review may also be contemplated, as described with relation to FIG. 1.

If the determination represented by block 110 was instead that the system was already operating in the normal, cruise-condition regime, it proceeds to block 116, in which it determines whether it should now depart from that operating regime. For the illustrated embodiment, the historical mode is entered only once per flight, such that each flight provides a single record for historical or trend analysis. Thus, block 116 may determine if a historical record for the flight has been obtained. There may be other reasons for which block 116 determines that the historical mode may be departed. Typical reasons for doing so, which indicate that data being taken are not valuable for comparison purposes, are that the rate of altitude change exceeds some maximum, such as 300 feet per minute, or that the air speed has fallen below a certain threshold, such as 70 knots indicated airspeed (kias or KTAS). If some such conditions occurs, the system leaves the historical-analysis mode and accordingly dispenses with historical analysis. Otherwise, it performs the block 114 historical analysis, as described in further detail with reference to FIG. 3.

Figure 3:
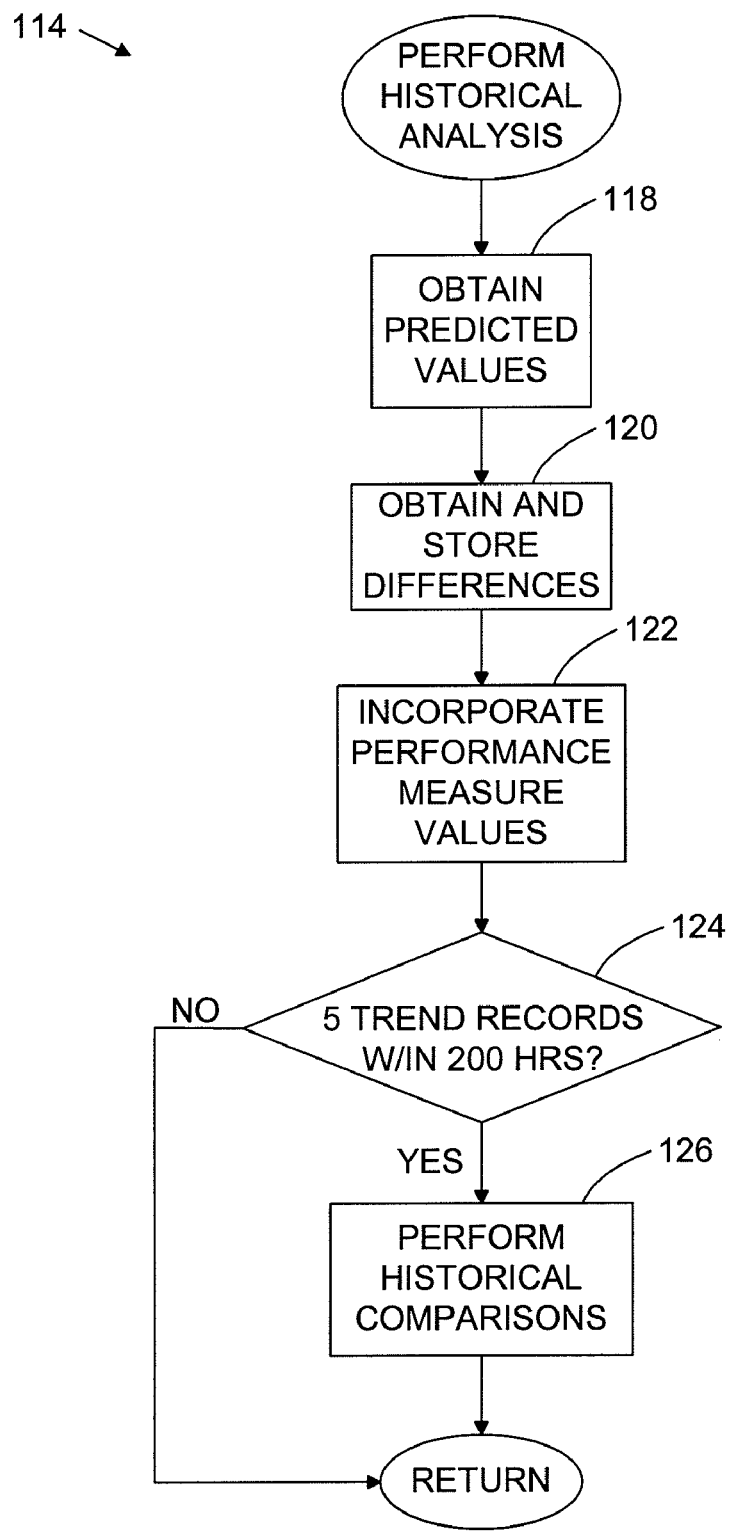
FIG. 3 is a flow chart that depicts one of FIG. 2's operations in more detail.

Using the actual values for the performance measures used in making the determination at block 110 of FIG. 2 to enter the historical mode, block 118 of FIG. 3 enters the lookup table or database described in relation to blocks 104 and 106 of FIG. 2 to obtain predicted values for other performance measures to be used in the historical analyses. For the exemplary embodiment, measured values for RPM, MAP, altitude and OAT may be used as indices in entering the table or database, though other performance measures may be used. The predicted values for the other performance measures are taken or interpolated from the table. For the exemplary embodiment, predicted values may be obtained for FF, true air speed (KTAS) and % power. Depending on the application, predicted values for other performance measures may be obtained. For example, maximum CHT and maximum EGT may be calculated by curve-fitting against published curves from the engine manufacturer and adjusted for outside air temperature, as necessary.

Block 120 obtains the differences between the predicted values and the actual values for the performance measures and stores the results in a trend record for the flight. For some parameters, the differences can be taken between a known value for 'normal' operating conditions and the actual value. Such 'normal' operating condition values, such as oil temperature and pressure, CHT temperatures and EGT temperatures may be obtained from manufacturer's literature. For those performance measures which do not have lookup table or database entries, or cannot be calculated, their actual values as measured during "cruise" conditions are incorporated into the trend record at block 122.

The system will typically be able to store data for thousands of flight hours, but some embodiments may for some purposes restrict attention to only the most-recent flights, particularly to observe trends. Further, in performing historical or trend analyses, it may be beneficial to use a certain minimum number of previous flight records taken during the stable-cruise regime of those previous flights. To represent this, FIG. 3's block 124 depicts the system as determining whether there are trend records for least five previous flights that took place within the last 200 hours of flight time. As can be appreciated, the number of previous flights and the timing of those flights can be varied to suit the historical and analyses to be performed. If there are sufficient trend records, the historical or trend comparisons are performed at block 126. As FIG. 3 indicates, no historical comparison occurs if no such records are available. However, in either case, the trend record for the current flight has been stored for possible use in historical analyses of future flights.

The historical comparisons of block 126 may be performed in various ways depending on the performance measure being compared. Generally, a value in the trend record for the current flight is compared to the average of the corresponding value from the trend records for the previous flights, whether the value is a difference value or the actual value of a performance measure. For some measures, such as oil temperature and pressure, the trend record value can also be compared to earlier readings taken from the same flight.

Referring again to FIG. 2, upon completion of the historical analysis, the illustrated embodiment then stores the analysis results, as at block 128, and updates the crew display as necessary, as at block 130. As was mentioned before, some embodiments may not employ a crew display, and some may defer some of the analysis and therefore storage of the analysis's results until on-ground apparatus is available for that purpose.

When the flight is complete, maintenance personnel can then tap into the recorded data. One approach would be for the ground apparatus to take the form of computers so programmed as to acquire the recorded data, determine the styles of display appropriate to the various parameters, provide the user a list of views among which to select for reviewing the data, and displaying the data in accordance with those views. However, although the illustrated embodiment does rely on ground apparatus to provide the display, it uses the on-board apparatus to generate the list of views and other user-interface elements. As was stated above, it does so by utilizing a so-called client-server approach where the on-board apparatus (server) provides web pages; the ground apparatus requires only a standard web-browser client to provide the desired user interface.

Figure 4A:
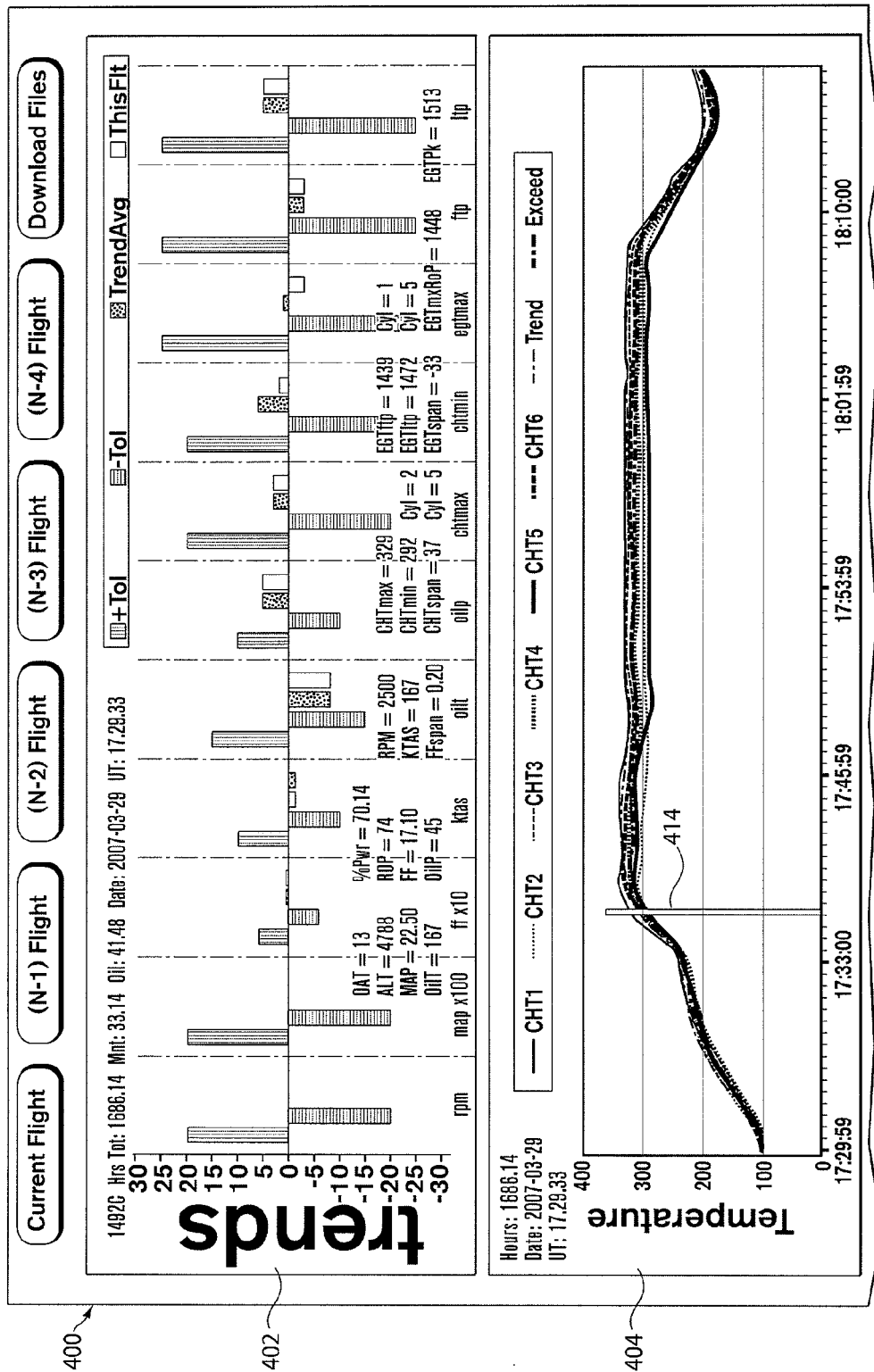
FIGS. 4A and 4B provide an example of the type of display that could be used to present some of the data taken by the system of FIG. 1.
Figure 4B:
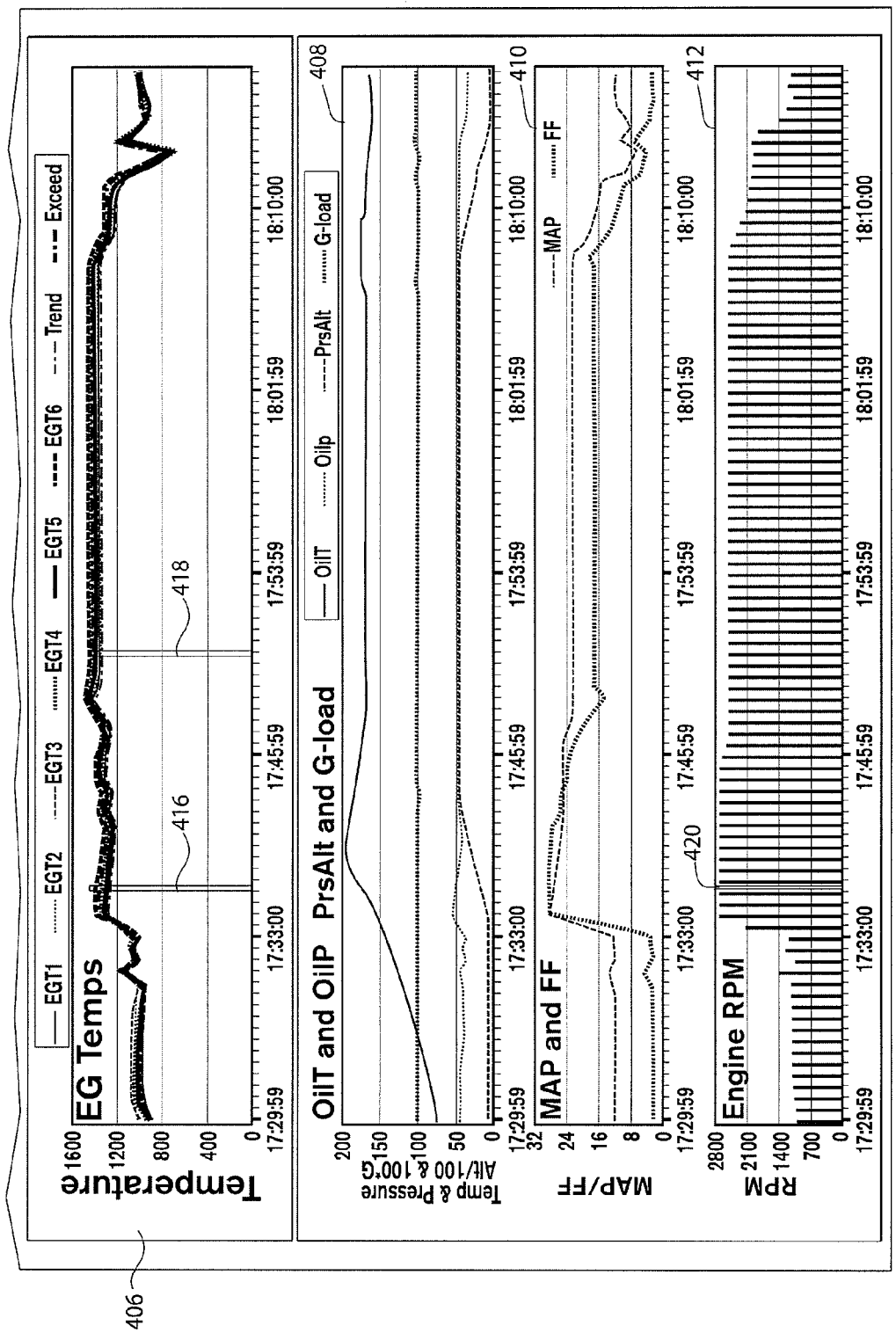

FIGS. 4A and 4B depicts one kind of display 400 that can be provided for this purpose. The top plot 402 of FIG. 4A shows one flight's trend analysis results, whereby comparisons have been analyzed for RPM, MAP, FF, True Airspeed, oil temperature and pressure, CHT maximum and minimum, EGT maximum and EGT first and last to peak. Plot 404 of FIG. 4A and plots 406-412 of FIG. 4B present CHTs (404), EGTs (406), oil temperature (OilT) and oil pressure (OilP) (408), MAP and FF (410) and engine RPM (412) as a function of time of day. Vertical Bars 414-420 may represent occurrences of exceedances or trend warnings. Other views could display other sets of data. As an example, the trend average in plot 402 may be replaced with a series of averages for two or more chronological groupings of the trend records of previous flights.

The accompanying Table illustrates a variety of operational parameters and tolerances to which the historical analysis may be applied. Different embodiments may employ different criteria and a given embodiment may use different criteria for different operational parameters or for different types of analysis of the same parameter, e.g., engine overhaul and changeout. If an anomaly had been detected, the entries that represented the anomalies would have been highlighted to notify the maintenance personnel.

Recorded Engine Data
Engine Trend Monitoring-Cruise Performance

| # | Parameter | Units | Tolerance Zone* |
|---|---|---|---|
| 1 | Air Speed | KTAS | ±2 KTAS |
| 2 | Altitude | Feet | ±200 Ft. |
| 3 | OAT | ° C. | Record |
| 4 | Engine RPM | RPM | ±20 RPM Set & Record |
| 5 | Engine MAP | In. Hg. | ±0.2 In. Hg. Set & Record |
| 6 | Fuel Flow | GPH | ±0.5 GPH |
| 7 | CHT Max | ° F./Cyl No | ±20° F. |
| 8 | CHT Min | ° F./Cyl No. | ±20° F. |
| 9 | EGT Hottest | ° F./Cyl No. | ±25° F. |
| 10 | EGT FTP (First to Peak) | ° F./Cyl No. | ±25° F. |
| 11 | EGT LTP (Last to Peak) | ° F./Cyl No. | ±25° F. |
| 12 | Oil Pressure | PSI | ±10 PSI |
| 13 | Oil Temp | ° F. | ±15° F. |
| 14 | Oil Added on last flight leg | Quarts | See Sect 6.2.2 |

In addition to providing a browser-based communications mode, the on-board system also enables the data to be read in other ways. For example, the on-board storage may also be examined and/or downloaded using the web server interface. Typically, but not necessarily, the on-board storage may take the form of a readily removable device, e.g., USB-interface flash-memory, which may contain the data in a comma-delimited or other simple file format easily read by employing standard techniques.

The memory device will typically have enough capacity to store data for thousands of hours—possibly, the aircraft's entire service history—so maintenance personnel may be able to employ a ground-based display to show data not only for the most recent flight but also for some selection of previous data, such as the most-recent three flights, the previous ten hours, all data since the last overhaul, the last two hundred hours, or the entire service history, together with indications highlighting anomalies of the type for which the system monitors those data.

FIG. 5 illustrates depicts one example of a Data Log 500 that may be used in trend monitoring. FIG. 5 illustrates a comparison between operational parameters for a current flight 502 and average (504), minimum (506) and maximum (508) operational parameters for comparable historical records, as may be determined by historical analysis (block 114 of FIGS. 2 and 3). Use of a log, such as Data Log 500, can facilitate spotting anomalous operating parameters. The log can highlight parameters that are trending towards being out of tolerance, and/or are in fact no longer within acceptable tolerance.

Other views may display other sets of data and/or other forms of comparison. For example, comparison plots may be similar to plots 404-410 of FIGS. 4A and 4B, but may show the historical trend for one or more parameters, where a value of the parameter for each record used in the historical analysis may represent a point along the time axis. If the parameters are consistent over time, as is the case indicated in FIG. 5, the comparison plots will show horizontal lines. Any deviation away from horizontal may indicate a trend towards being out of tolerance and can be highlighted to maintenance personnel.

The present invention's approach to analyzing and predicting engine-related items that can be adjusted or repaired before more-significant maintenance action is required helps avoid more-costly and longer-down-time overhauls and can significantly reduce the probability of a catastrophic in-flight failure. As a result, it makes it possible to reduce maintenance costs for piston-engine aircraft without impairing (perhaps even enhancing) safety. It therefore constitutes a significant advance in the art.

The methods and systems described herein are not limited to a particular hardware or software configuration, and may find applicability in many computing or processing environments. For example, the algorithms described herein can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, USB Flash storage, or other storage device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired, wireless, or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer (s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment (s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet.

Although the methods and systems have been described relative to specific embodiments thereof, they are not so limited. For example, the methods and systems may be applied to monitoring engine performance in the trucking industry, or other industries where trend monitoring may help reduce engine maintenance and/or overhaul requirements. As described with respect to FIGS. 2 and 3 for aircraft engine monitoring, a driver, marine pilot, or other operator may operate an engine at steady state or "cruise" conditions to obtain engine parameter readings for historical analysis. Obviously many modifications and variations may become apparent in light of the above teachings and many additional changes in the details, materials, and arrangement of parts, herein described and illustrated, may be made by those skilled in the art.

The invention claimed is:

1. A computer-implemented method for periodically monitoring performance of an engine in an aircraft during flight operations for predicting future engine problems, comprising:
    (a) receiving at a computer system engine performance data, environmental data, and flight data during use of the engine;
    (b) determining, using the computer system, if the engine is operating within a predetermined parameter set;
    (c) when the engine is operating within the predetermined parameter set and the aircraft is determined to be operating in a stable cruise regime, comparing, using the computer system, the engine performance data with previous engine performance data from at least one previous use of the same engine when the engine was operating within the predetermined parameter set taking into account the environmental data and flight data associated with the engine performance data and the previous engine performance data;
    (d) outputting, from the computer system, results of step (c); and
    (e) repeating steps (a) through (d) on successive flights of the aircraft.

2. The method of claim 1, further comprising controlling the engine to operate within the predetermined parameter set.

3. The method of claim 1, wherein the engine is a piston engine.

4. The method of claim 1, further comprising predicting a future excursion of an engine performance parameter beyond allowable tolerance limits based on trend analysis of results of step (c).

5. The method of claim 1, further comprising storing the results of step (c) in memory to be used in subsequent analyses of engine performance data.

6. The method of claim 2, wherein controlling the engine comprises:
    maintaining a certain altitude to allow the engine to stabilize;
    setting the engine at a recommended percent cruise power; and
    setting a fuel mixture to one of a recommended best power mixture and recommended best economy mixture.

7. The method of claim 6, wherein the recommended percent cruise power is set at 72%±2% and the best power mixture is set at 75° F.±10° F. rich of peak exhaust gas temperature.

8. The method of claim 3, wherein:
    obtaining the performance data comprises obtaining at least one instrument output taken from a listing of instrument outputs including oil temperature, oil pressure, manifold pressure, engine speed, fuel flow, cylinder head temperature and exhaust gas temperature; and
    obtaining the environmental data comprises obtaining at least one instrument output taken from a listing of instrument outputs including true airspeed, indicated airspeed, pressure altitude, density altitude, outside air temperature, and vertical speed.

9. The method of claim 8, wherein comparing comprises:
    obtaining a predicted value for at least one instrument output;
    storing a difference between the predicted value and an actual value of the at least one instrument output to a current trend record; and
    storing other instrument outputs to the current trend record.

10. The method of claim 9, wherein obtaining previous performance data comprises determining if trend records for a predetermined number of previous uses are stored.

11. The method of claim 8, wherein comparing comprises obtaining averages for values stored in the trend records for previous uses and comparing values of the current trend record to corresponding averages from the trend records of previous uses.

12. The method of claim 11, wherein outputting comprises:
    displaying values of the current trend record;
    displaying the corresponding averages; and
    displaying tolerances associated with respective values of the current trend record.

13. The method of claim 12, wherein displaying comprises displaying values associated with instrument outputs taken from a listing of instrument outputs including engine speed, manifold pressure, fuel flow, air speed, altitude, oil temperature, oil pressure, maximum cylinder head temperature, minimum cylinder head temperature, maximum exhaust gas temperature, exhaust gas temperature of the first cylinder to peak and exhaust gas temperature of the last cylinder to peak.

14. The method of claim 11, wherein obtaining averages comprises obtaining averages for chronological groupings of trend records for previous uses.

15. The method of claim 8, wherein obtaining performance data comprises providing an indication to an operator when a value of at least one of the instrument outputs differs from a predicted value by more than a predetermined tolerance.

16. The method of claim 15, further comprising obtaining the predicted value from a lookup table.

17. The method of claim 16, further comprising performing interpolation calculations within the lookup table.

18. The method of claim 8, wherein obtaining performance data comprises periodically obtaining and recording at least one instrument output for each of the performance data and the environmental data.

19. The method of claim 18, wherein outputting further comprises displaying a historical record of the periodically obtained at least one instrument output.

20. The method of claim 1, wherein obtaining performance data comprises providing an indication to an operator when a value of at least one of the performance data differs from a predicted value by more than a predetermined tolerance.

21. The method of claim 20, further comprising obtaining the predicted value from a lookup table.

22. The method of claim 21, further comprising performing interpolation calculations within the lookup table.

23. The method of claim 1, wherein comparing comprises:
obtaining predicted values for the engine performance data based in part on the environmental data; and
storing differences between the predicted values and actual values of the engine performance data to a current trend record.

24. The method of claim 23, wherein obtaining previous performance data comprises determining if trend records for a predetermined number of previous uses are stored.

25. The method of claim 24, wherein comparing comprises obtaining averages for values stored in the trend records for previous uses and comparing values of the current trend record to corresponding averages from the trend records of previous uses.

26. The method of claim 25, wherein outputting comprises:
displaying values of the current trend record;
displaying the corresponding averages; and
displaying tolerances associated with respective values of the current trend record.

27. The method of claim 1, wherein step (b) comprises determining if the engine is operating within a predetermined parameter set within an acceptable tolerance limit for each parameter in the parameter set using the engine performance data, the environmental data, and the flight data.

28. The method of claim 1, wherein step (c) further comprises comparing the engine performance data with predicted performance values for the engine based in part on the environmental data and the flight data.

* * * * *